Dec. 3, 1946.  H. A. FINK ET AL  2,412,139
APPARATUS FOR LACQUER COATING SIDE SEAMS OF CAN BODIES
Filed May 2, 1945  2 Sheets-Sheet 1

Inventors
Henry A. Fink
Bernard D. Bloser
By Mason, Porter & Diller
Attorneys

Dec. 3, 1946.  H. A. FINK ET AL  2,412,139
APPARATUS FOR LACQUER COATING SIDE SEAMS OF CAN BODIES
Filed May 2, 1945  2 Sheets-Sheet 2
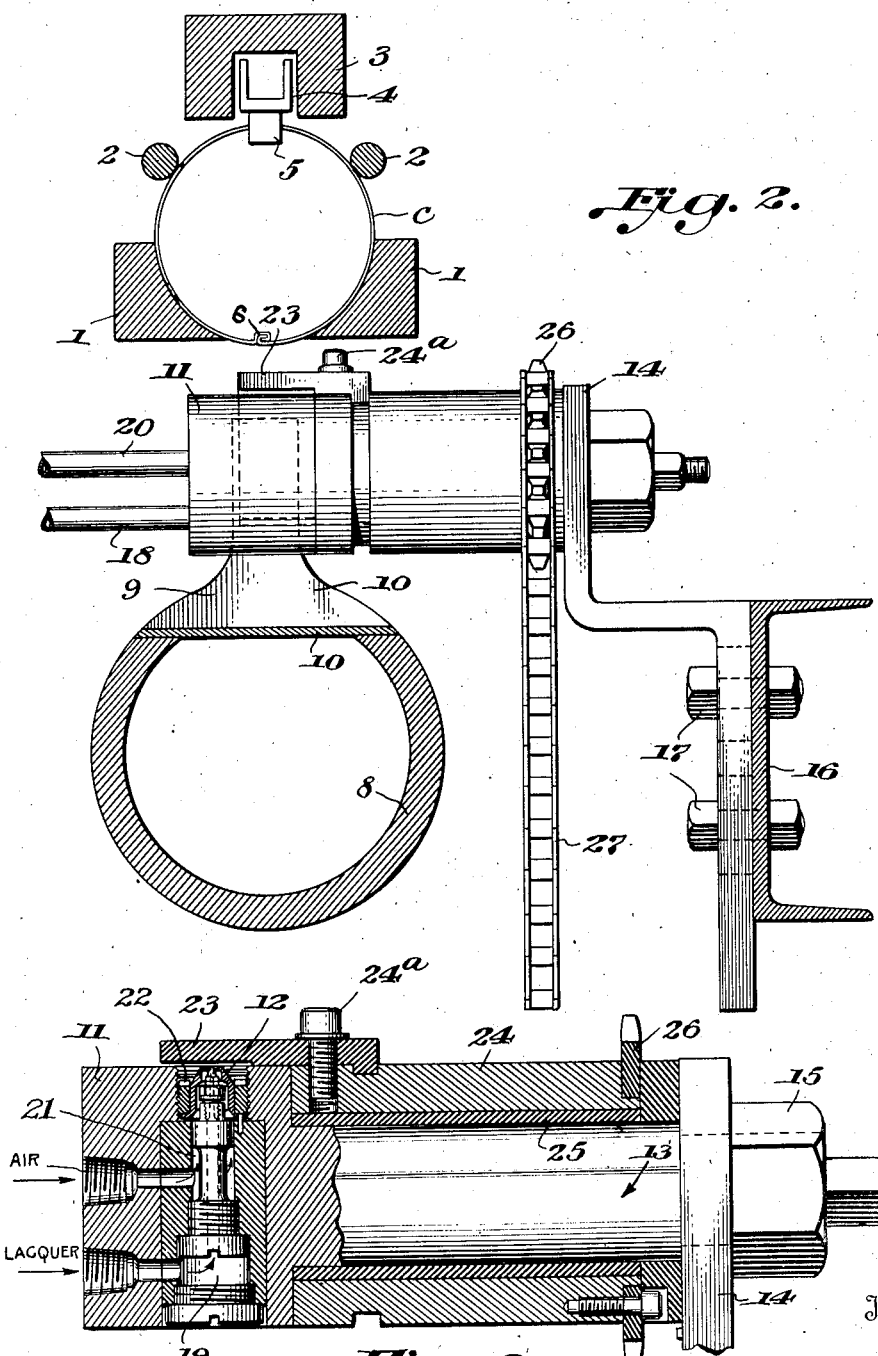

Patented Dec. 3, 1946

2,412,139

UNITED STATES PATENT OFFICE 2,412,139

APPARATUS FOR LACQUER COATING SIDE SEAMS OF CAN BODIES

Henry A. Fink and Bernard D. Bloser, New York, N. Y., assignors to Continental Can Company, Inc., New York, N. Y., a corporation of New York Application May 2, 1945, Serial No. 591,520

3 Claims. (Cl. 91—45)

The invention relates to new and useful improvements in an apparatus for coating the outer face of the can body in the area of the side seam only. It is well known that when either silver solder or other high melting point low-tin content solders are used in soldering hot dipped or electroplated tin plate, outside rusting and discoloration in the region of the side seam will occur more rapidly than when the lower melting point high-tin content solders are used. This more rapid rusting is due mainly to the removal from or the disturbance of the tin coating of the tin plate at the soldercoated area during the soldering and wiping because of the lower melting point of the tin coating than the solder which is being applied thereto.

An object of the invention is to provide a means for spray coating lacquer on the outer face of the can bodies in the area of the side seam only as the can bodies are moving through the machine in timed spaced relation to each other wherein a means is provided for cutting off the spray during the time interval between the moving can bodies.

In the drawings which show by way of illustration one embodiment of the invention—

Figure 2 is an enlarged sectional view on the line 2—2 of Figure 1;

Figure 3 is a sectional view through the spray head showing the mounting for the shield which cuts off the spray in the time interval between the moving can bodies;

The invention has to do with a device applied to a sideseam solder bonding machine for spraying the outer surface of the can body in the region of the side seam only just prior to the discharge of the can body from the solder horse. The soldering machine is of the usual type in which the can bodies are passed over a solder roll rotating in a bath of solder. The solder roll extends lengthwise of the bath and the can body side seam is guided by an outside horse so that the solder seam engages the solder coating lifted from the bath by the solder applying roll. This is such a common type of solder applying machine that it is not thought necessary to disclose the machine in any great detail.

The solder horse which guides the can bodies over the solder bath is formed in two sections. The two sections are spaced away from each other at the lower side so as to expose the side seam for the application of solder to the outer face of the can body. The upper edge portions of the solder horse are also spaced away from each other so as to permit the feed dogs to contact with and move the can bodies through the horse in spaced, timed relation to each other. The can bodies move in succession one after another through the solder horse and solder is applied to the side seam thereof. These features of construction are also of the usual character and detailed disclosure thereof is not thought necessary.

Figure 1:
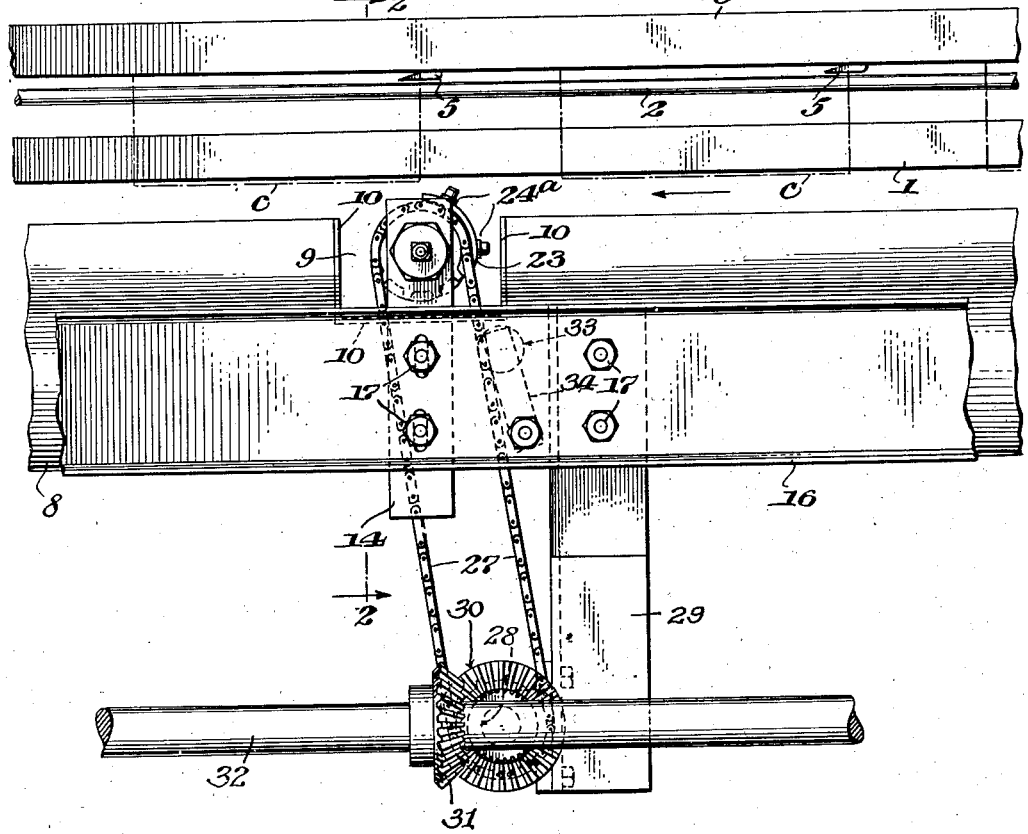
Figure 1 is a side view showing a portion of a solder applying machine with the spray coating devices applied thereto.

In the drawings there is shown a portion of the usual frame structure of a soldering machine and supported on this frame structure in the usual way is a solder horse which includes two sections 1, 1. The inner faces of these two sections conform to the can body which is being soldered and the two sections at the lower side thereof are spaced from each other so that the side seam is exposed for the purpose of applying solder thereto. As shown in Figure 2, the solder horse sections 1, 1 are cut away at their upper sides and guide rods 2, 2 are substituted therefor. Directly above the guide rods is a channel member 3 through which a feed chain 4 having feed dogs 5 passes. The feed dogs as shown in Figure 1, are spaced from each other a uniform distance. The can bodies to be soldered are indicated in broken lines at C in this figure. The cans are moving in the direction of the arrow. It will be noted that the can bodies are spaced from each other. This is a necessary incident to the shaping of the can bodies and the forming of the side seams.

Figure 5:
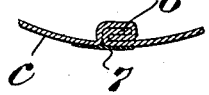
Figure 5 is a detail showing a portion of a can body in section and the area to which the lacquer coating is applied.

The present invention has to do with a device for applying a lacquer coating to the outer face of the can body in the region of the side seam only. As shown in Figure 5, the can body C has interlocked hooks forming a side seam 6. The coating which is applied to the side seam is indicated diagrammatically at 7.

Immediately below the solder horse is a manifold 8 for directing cooling air against the side seam for the cooling of the same. This manifold is of the usual construction. The manifold is cut away as indicated at 9 and is closed by plates 10 so that the air does not pass from the manifold into the space 9. Located in this space 9 is a spray head 11 having a nozzle 12 for directing a spray of lacquer upwardly against the side seam of the can body. This nozzle is directly beneath the side seam. The spray head is carried by a cylindrical supporting member 13 which has a reduced section extending through a bracket arm 14. A nut 15 threaded onto the outer end of the reduced portion firmly secures the spray head to this bracket 14. The bracket 14 is connected to the frame 16 by suitable bolts 17, 17. A pipe 18 leading from a suitable source of lacquer supply is connected to the spray head 11. This spray head has a chamber 19 therein to which this pipe is connected. Air is supplied to the spray nozzle through a pipe 20.

Within the spray head is a chamber 21 and the air supplying pipe is connected to this chamber so that air under pressure may be introduced into the chamber. The lacquer under slight pressure is also introduced into the chamber 19. The air issuing from the nozzle 12 will draw the lacquer from the chamber 19 and deliver it in the form of a spray in an upward direction against the side seam of the can body. The nozzle is of the usual construction and detailed description thereof is not thought necessary.

The spray head 11 has a recess 22 formed therein and the nozzle sets down in this recess so that the upper end of the nozzle is flush with the outer face of the spray head. The spray head is cylindrical in cross section. Associated with this spray head is a shield 23. This shield is curved to conform to the outer face of the spray head and is dimensioned so that the inner face of the shield is spaced a slight distance away from the spray head. The shield is carried by a sleeve 24 mounted for rotation on the cylindrical supporting member 13 for the spray head.

Between the sleeve 24 and the cylindrical support 13 is a wear sleeve 25. Attached to the sleeve 24 is a sprocket wheel 26 which sprocket wheel is secured to the sleeve in any suitable way. A sprocket chain 27 runs over the sprocket wheel 26 and rotates the shield about the spray head. This sprocket chain 27 is driven by a sprocket wheel on a shaft 28 mounted for rotation in the frame member 29 of the machine. A bevel gear 30 carried by this stub shaft meshes with a bevel gear 31 carried by a shaft 32 operated in timing with the movable parts of the solder applying machine and in particular in timing with the means for operating the conveyor chain which carries the cans through the horse.

The bolts 17 pass through elongated slots in the bracket 14 which permits the bracket to be raised and lowered to a limited extent. An idler 33 carried by a shiftable arm 34 contacts with the sprocket chain for holding it under proper tension. The purpose of the shield is to cut off the spray during the time interval between the passing can bodies.

Figure 4:
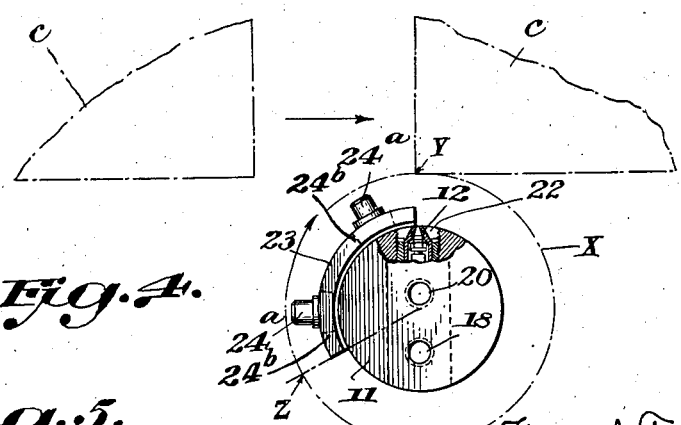
Figure 4 is a view showing more or less diagrammatically the spray head and the passing can bodies.

Referring to Figure 4, it is noted that the shield 23 extends through an arc of 120°. As it passes the nozzle it will intercept the spray for this angle of travel of the shield. While the shield is rotating through 240° the nozzle is uncovered. Therefore the period of time when the nozzle is uncovered and is directing a spray against the side seam is twice the interval of time when the spray is intercepted. The distance between the can bodies should, therefore, be made half the length of a can body.

When the space between the can bodies relative to the length of the can body is varied, then the length of the shield must be varied. When the length of the can body is varied so that the time interval necessary for the coating of the side seam is increased, then the time interval for the rotation of the shield must be decreased to correspond therewith. In other words, when the time interval between the presenting of the advanced edge of a side seam of one can body to the presenting of the advanced edge of the side seam of the following can body is increased or decreased, the time of rotation of the shield must be correspondingly decreased or increased so that the shield will make one complete rotation during this time interval. If the spacing between the cans is varied without changing the time interval just referred to, the shield must be lengthened or shortened to conform to the spacing.

In Figure 4 the coating point is indicated at Y. The angle of travel of the shield is indicated by the circle X. The advanced edge of the shield is in line with the coating point Y and the spray is about to be intercepted. While the shield is rotating through the angle from Z to Y, the spray will be intercepted and then the spray will be uncovered until the advanced edge of the shield again intercepts the spray.

The shield is secured to the supporting sleeve 24 by bolts 24a, 24a and can be adjusted circumferentially of the spray head or readily removed and replaced by a shield of different length. The shield is made adjustable by lengthening the slots 24b through which the bolts pass. These slots extend circumferentially of the shield and permit the same to be adjusted in a circumferential direction about the spray head when the bolts are loosened. After adjustment has been made the bolts are tightened for holding the shield in a set position. The shield is spaced away from the spray head so that the shield does not stop the flow of the spray, but cuts off the spray so that it is not directed against the horse guiding the can bodies during the time interval when there is no can body moving through the field of the spray. When the shield is spaced away from the nozzle so as to intercept the spray, instead of closing off the spray, the lacquer will flow continuously through the nozzle, will collect on the spray head and drop therefrom into a pan for collecting the same. By this arrangement the plugging of the spray tip is avoided. Suitable hoods or shields may be supplied for collecting and carrying off the fumes incident to the spraying of the side seam.

The spray as it leaves the nozzle will spread out to a certain extent and will contact with the can body at the seam opening and at each side thereof throughout the limits where disturbance of the tin coating is likely to occur. It is this limited area only which is coated with lacquer. If it is desired to change the width of the strip of lacquer applied to the can body, the spray head is raised or lowered, which can be readily accomplished owing to the slots through which the bolts 17 pass.

It is obvious that many changes in the details of construction and the arrangement of the parts may be made without departing from the spirit of the invention as set forth in the appended claims.

We claim:

1. In a can body soldering machine, a horse for guiding can bodies with the side seam of each can body exposed for treatment; means for moving the can bodies along the horse in spaced timed relation; a nozzle disposed beneath the path of travel of the side seam for projecting a spray of lacquer onto the outer face of the moving can bodies in the area of the side seams; and means for cutting off the spray during the time interval between passing can bodies.

2. In a can body soldering machine, a horse for guiding can bodies with the side seam of each can body exposed for treatment, means for moving the can bodies along the horse in spaced timed relation, a stationary nozzle disposed beneath the path of travel of the side seam for projecting a spray of lacquer onto the outer face of the moving can bodies in the area of the side seams and a rotating shield for intercepting the spray during the time interval between passing can bodies.

3. In a can body soldering machine, a horse for guiding can bodies with the side seam of each can body exposed for treatment, means for moving the can bodies along the horse in spaced timed relation, a cylindrical spray head disposed beneath the path of travel of the side seams, said spray head having a recess in the upper face thereof, a nozzle mounted in said recess for projecting a spray of lacquer onto the outer face of the passing can bodies in the area of the side seams, a shield mounted for rotation about the center of the spray head, said shield being spaced from the outer face of the spray head and the nozzle so as to intercept the spray discharged from the nozzle, and means for rotating the shield so as to intercept the spray during the time interval between passing can bodies.

HENRY A. FINK.
BERNARD D. BLOSER.